US010008227B1

(12) United States Patent
Sudo et al.

(10) Patent No.: US 10,008,227 B1
(45) Date of Patent: Jun. 26, 2018

(54) MAGNETIC DISK APPARATUS

(71) Applicant: Kabushiki Kaisha Toshiba, Minato-ku, Tokyo (JP)

(72) Inventors: Daisuke Sudo, Yokohama Kanagawa (JP); Takeyori Hara, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days. days.

(21) Appl. No.: 15/667,933

(22) Filed: Aug. 3, 2017

(30) Foreign Application Priority Data

Mar. 16, 2017 (JP) .................................. 2017-051806

(51) Int. Cl.
*G11B 5/55* (2006.01)

(52) U.S. Cl.
CPC .......... *G11B 5/5547* (2013.01); *G11B 5/5534* (2013.01); *G11B 5/5565* (2013.01)

(58) Field of Classification Search
CPC ......... G11B 5/54–5/55; G11B 5/5521–5/5586; G11B 5/596–5/59627
USPC ............................... 360/69, 75, 78.04–78.14
See application file for complete search history.

(56) References Cited

U.S. PATENT DOCUMENTS

| 6,909,575 | B2 | 6/2005 | Soyama et al. |
| 6,917,486 | B2 * | 7/2005 | Tanner ................. G11B 5/5526 360/75 |
| 6,967,811 | B1 * | 11/2005 | Codilian ............... G11B 5/5547 360/78.06 |
| 7,009,806 | B2 * | 3/2006 | Zayas ....................... G11B 5/54 360/78.04 |
| 7,027,368 | B2 | 4/2006 | Kajino et al. |
| 7,082,009 | B2 * | 7/2006 | Zayas .................. G11B 5/5521 360/78.04 |
| 7,436,616 | B2 * | 10/2008 | Hansen ..................... G11B 5/54 360/75 |
| 7,468,859 | B2 * | 12/2008 | Hansen ................ G11B 5/5547 360/78.04 |
| 7,561,366 | B2 * | 7/2009 | Wasa ...................... G11B 21/12 360/75 |
| 2010/0046112 | A1 | 2/2010 | Ishiyama |
| 2012/0075742 | A1 * | 3/2012 | Takakura ............. G11B 5/5547 360/75 |
| 2012/0281311 | A1 * | 11/2012 | Ishihara ................... G11B 5/54 360/78.06 |

FOREIGN PATENT DOCUMENTS

| JP | 2001-298986 A | 10/2001 |
| JP | 2003-085902 A | 3/2003 |
| JP | 2010-049769 A | 3/2010 |

* cited by examiner

*Primary Examiner* — Wayne Young
*Assistant Examiner* — James L Habermehl
(74) *Attorney, Agent, or Firm* — White & Case LLP

(57) ABSTRACT

According to one embodiment, a magnetic disk apparatus includes a magnetic head, a voice coil motor, a driving circuit, and a VCM resistance estimation unit. The magnetic head accesses a magnetic disk. The voice coil motor drives the magnetic head over the magnetic disk. The driving circuit applies a VCM current to the voice coil motor. The VCM resistance estimation unit estimates a VCM resistance in the voice coil motor based on the saturated VCM current and a velocity of the magnetic head.

19 Claims, 12 Drawing Sheets

MAGNETIC DISK APPARATUS

CROSS-REFERENCE TO RELATED APPLICATIONS

This application is based upon and claims the benefit of priority from Japanese Patent Application No. 2017-51806, filed on Mar. 16, 2017; the entire contents of which are incorporated herein by reference.

FIELD

Embodiments described herein relate generally to a magnetic disk apparatus.

BACKGROUND

A magnetic disk apparatus may generate heat during a seek of a magnetic head to cause the failure of the magnetic head.

DETAILED DESCRIPTION

In general, according to one embodiment, magnetic disk apparatus includes a magnetic disk, a magnetic head, a voice coil motor, a driving circuit, and a VCM resistance estimation unit. The magnetic head accesses the magnetic disk. The voice coil motor drives the magnetic head over the magnetic disk. The driving circuit applies a VCM current to the voice coil motor. The VCM resistance estimation unit estimates a VCM resistance in the voice coil motor based. on the saturated VCM current and a velocity of the magnetic head.

Exemplary embodiments of a magnetic disk apparatus will be explained below in detail with reference to the accompanying drawings. The present invention is not limited to the following embodiments.

(First Embodiment)

Figure 1A:
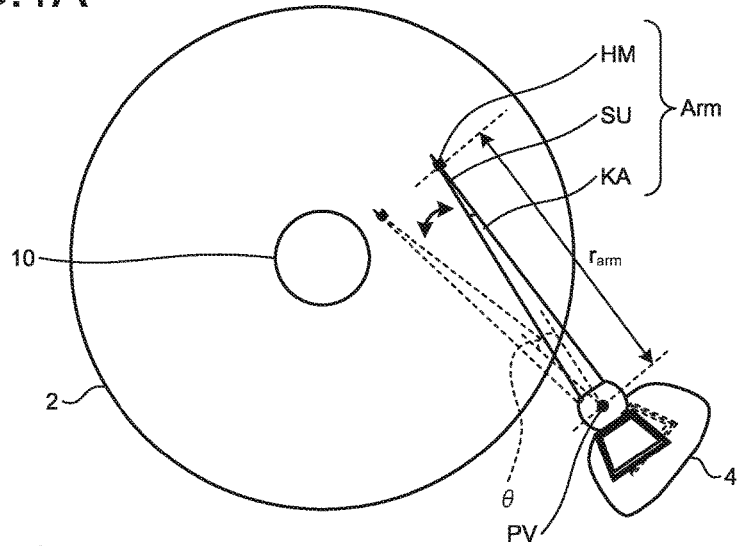
FIG. 1A is a plane view of a magnetic head performing a seek over a magnetic disk according to a first embodiment.
Figure 1B:
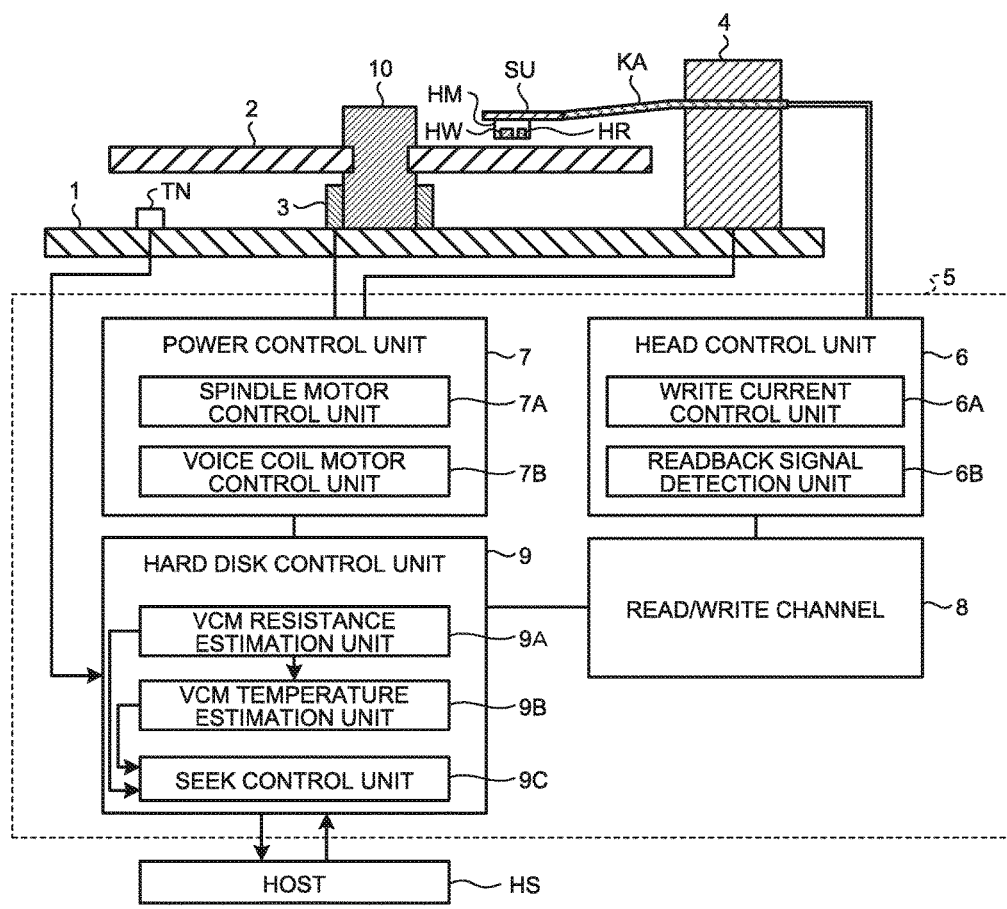
FIG. 1B is a schematic block diagram of a magnetic disk apparatus according to the first embodiment.

FIG. 1A is a plane view of a magnetic head performing a seek over a magnetic disk according to a first embodiment, and FIG. 1B is a schematic block diagram of a magnetic disk apparatus according to the first embodiment.

Referring to FIGS. 1A and. 1B, the magnetic disk apparatus has a magnetic disk 2 that is supported by a housing 1 via a spindle 10.

The magnetic disk apparatus also has a head slider HM. The head slider HM has a write head HW and a read head HR as magnetic heads. The write head HW and the read head HR are opposed to the magnetic disk 2. The head slider HM is held over the magnetic disk 2 via a suspension SU and a carriage arm KA. The carriage arm KA is slidable on the head slider HM in a horizontal plane at a seek time or the like. The suspension SU applies a pressing force to the magnetic head against the floating force of the magnetic head resulting from an air flow with the rotation of the magnetic disk 2, thereby to keep constant the floating amount of the magnetic head over the magnetic disk 2. The suspension SU can be formed from a plate spring.

The magnetic disk apparatus also has a voice coil motor 4 that drives the carriage arm KA and a spindle motor 3 that rotates the magnetic disk 2 around the spindle 10. The voice coil motor 4 and the spindle motor 3 are fixed to the housing 1.

The magnetic disk apparatus also has a control unit 5 that controls the operations of the magnetic disk apparatus. The control unit 5 can control the positions of the write head HW and the read head HR with respect to the magnetic disk 2 based on the servo data read by the read head HR. The control unit 5 has a head control unit 6, a power control unit 7, a read/write channel 8, and a hard disk control unit 9.

The head control unit 6 has a write current control unit 6A and a readback signal detection unit 6B. The power control unit 7 has a spindle motor control unit 7A and a voice coil motor control unit 7B.

The head control unit 6 amplifies or detects a signal at the time of recording and reading. The write current control unit 6A controls a write current flowing through the write head HW. The readback signal detection unit 6B detects the signal read by the read head HR.

The power control unit 7 drives the voice coil motor 4 and the spindle motor 3. The spindle motor control unit 7A controls the rotation of the spindle motor 3. The voice coil motor control unit 7B controls driving of the voice coil motor 4. In this case, the voice coil motor control unit 7B can control a voice coil motor (VCM) current flowing into the coil in the voice coil motor 4.

The read/write channel 8 passes data between the head control unit 6 and the hard disk control unit 9. The data includes read data, write data, and servo data. For example, the read/write channel 8 converts the signal to be read by the read head HR into a data format that can be handled by a host HS or converts the data output from the host HS into a signal format that can be recorded on the write head HW. The format conversion includes DA conversion, encoding, AD conversion, and decoding. The read/write channel 8 also decodes the signal read by the read head HR and subjects the data output from the host HS to code modulation.

The hard disk control unit 9 controls recording and reading under instructions from the outside of the magnetic disk apparatus (for example, the host HS) and passes data between the outside and the read/write channel 8. The hard disk control unit 9 has a VCM resistance estimation unit 9A, a VCM temperature estimation unit 9B, and a seek control unit 9C. The VCM resistance estimation unit 9A, the VCM temperature estimation unit 9B, and the seek control unit 9C can be implemented by firmware.

The VCM resistance estimation unit 9A can estimate a VCM resistance in the voice coil motor 4 based on the saturated VCM current in the voice coil motor 4 and a velocity of the magnetic head. The VCM resistance is a coil resistance in the voice coil motor 4. The saturated state of the VCM current refers to the state in which the VCM current in the voice coil motor 4 does not increase even with increase in a current indication value of the VCM current in the voice coil motor 4. The VCM temperature estimation unit 9B can estimate the VCM temperature based on the VCM resistance in the voice coil motor 4. The seek control unit 9C can perform a seek control base on the VCM resistance in the voice coil motor 4 and the VCM temperature.

The hard disk control unit 9 may have separately a processor that controls recording and reading and a processor that controls passing of data between the host HS and the read/write channel 8. Alternatively, the same processor may be used for recording and reading control and data passage control. The processor can be a CPU.

The magnetic disk apparatus also has a temperature sensor TN. The temperature sensor TN can be fixed to the housing 1. The temperature sensor TN can measure the housing temperature. The temperature sensor TN may be mounted on a substrate on the rear side of the housing 1. A processor, a memory, an ASIC, and others implementing the functionality of the control unit 5 can be mounted on the substrate on the rear side of the housing 1.

The control unit 5 is connected to the host HS. The host HS may be a personal computer that issues a write command and a read command to the magnetic disk apparatus or a network connectable to a server or the like. That is, the magnetic disk apparatus can be used as an external storage apparatus for the host HS. The magnetic disk apparatus may be externally attached to the host HS or may be built in the host HS.

While the spindle motor 3 rotates the magnetic disk 2, the magnetic head reads a signal from the magnetic disk 2 and the readback signal detection unit 6B detects the signal. The read/write channel 8 subjects the signal detected by the readback signal detection unit 6B to data conversion and sends the same to the hard disk control unit 9. The hard disk control unit 9 performs a tracking control on the magnetic head based on a burst pattern included in the signal detected by the readback signal detection unit 6B.

The demodulation position of the magnetic head is calculated based on the sector/cylinder information included in the signal detected by the readback signal detection unit 6B to predict the current position of the magnetic head, and the magnetic head is brought into a seek control to come close to the target position.

Under a seek control, the profile of the VCM current can be set to allow the magnetic head to reach the seek destination from the present position. The profile of the VCM current can be set using the VCM resistance estimated by the VCM resistance estimation unit 9A.

In addition, under a seek control, the seek mode can be changed based on the head generated during the seek. Specifically, when the VCM temperature is high due to the heat generated during the seek, switching can be done from a normal seek mode to a low-heat seek mode in which heat is less generated. In the low-heat seek mode, the VCM current can be reduced as compared to that in the normal seek mode. In addition, the VCM temperature for use in the determination on the change of the seek mode can be the VCM temperature estimated by the VCM temperature estimation unit 9B.

Estimating the VCM resistance in the voice coil motor 4 based on the saturated VCM current in the voice coil motor 4 makes it possible to estimate the VCM resistance in the voice coil motor 4 based on the power supply voltage applied to the voice coil motor 4. Accordingly, the VCM resistance in the voice coil motor 4 can be estimated without measuring the voltage between terminals of the voice coil motor 4, which eliminates the attachment of a voltage sensor to the voice coil motor 4.

In addition, estimating the VCM resistance in the voice coil motor 4 based on the saturated VCM current in the voice coil motor 4 makes it possible to improve the accuracy of the VCM resistance as compared to the case of correcting the temperature dependency of the VCM resistance based on the housing temperature measured by the temperature sensor TN.

Further, estimating the VCM resistance in the voice coil motor 4 based on the saturated VCM current in the voice coil motor 4 eliminates the need to measure the VCM temperature. Accordingly, the VCM temperature can be estimated without having to use a temperature sensor for measuring the VCM temperature.

Moreover, changing the seek mode based on the heat generated during a seek prevents the VCM temperature from rising abnormally. Accordingly, it is possible to suppress dust generation from the voice coil motor 4 and prevent breakdown of the magnetic head.

A method for estimating the VCM resistance and VCM temperature of the magnetic disk according to the first embodiment will be described below in detail with the use of equations.

Used in the following description is a model in which the rotary motion system illustrated in FIG. 1A is equivalently converted into a translational motion system. When the rotation angle of an arm Arm is designated as θ, the relationship between a VCM current $I_{VCM}$ flowing into the voice coil motor 4 and an angular acceleration θ" of the arm Arm can be given by Equation (1) as follows:

$$\theta'' = K_t / J \cdot I_{VCM} \qquad (1)$$

where $K_t$ [N·m/A] represents a current torque constant and $J$ [kg·m$^2$] represents the moment of inertia of the arm Arm. The arm Arm can include the head slider HM, the suspension SU, and the carriage arm KA illustrated in FIG. 1A.

With an approximation that the magnetic head makes translational motion to the radial direction of the magnetic disk 2, a current force constant $K_f$ [N/A] and a mass m [kg] equivalent to the current torque constant $K_t$ and the moment of inertia J of the arm Arm will be discussed. In this case, the current force constant $K_f$ and the mass m can be given by Equations (2) and (3) as follows:

$$K_f = K_t / r_{arm} \quad (2)$$

$$m = J / r_{arm}^2 \quad (3)$$

where $r_{arm}$ represents arm length that is the distance between the magnetic head and a pivot PV.

The relationship between the VCM current $I_{VCM}$ flowing into the voice coil motor 4 and the acceleration a of the arm Arm can be given by Equations (4) and (5) as follows:

$$a = K_f/m \cdot I_{VCM} = 1/k_{ai} \cdot I_{VCM} \quad (4)$$

$$k_{ai} = m/K_f \quad (5)$$

where $k_{ai}$ represents acceleration—current conversion factor.

Figure 2A:
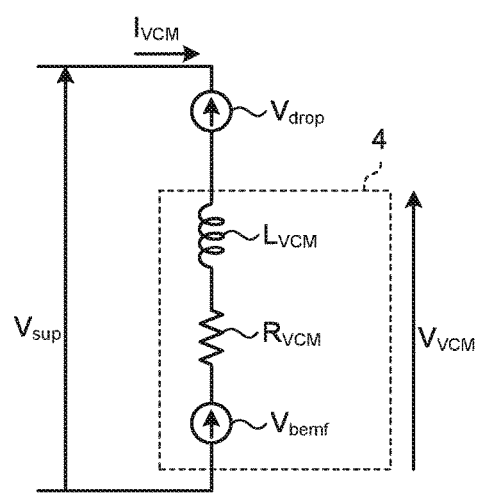
FIG. 2A is a diagram schematically illustrating an equivalent circuit with a major current change in a voice coil motor illustrated in FIG. 1.
Figure 2B:
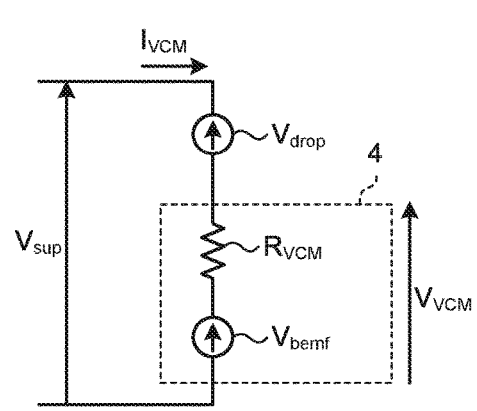
FIG. 2B is a diagram schematically illustrating an equivalent circuit with a minor current change in the voice coil motor illustrated in FIG. 1.

FIG. 2A is a diagram schematically illustrating an equivalent circuit with a major current change in the voice coil motor illustrated in FIG. 1, and FIG. 2B is a diagram schematically illustrating an equivalent circuit with a minor current change in the voice coil motor illustrated in FIG. 1.

Referring to FIG. 2A, the equivalent circuit of the voice coil motor 4 can be expressed by a series circuit of a VCM resistance $R_{VCM}$ and an inductance $L_{VCM}$. In this case, when a power supply voltage $V_{sup}$ is applied to the voice coil motor 4 to flow the VCM current $I_{VCM}$, a back electro motive force (BEMF) occurs and a back electro motive voltage $V_{bemf}$ is generated by the velocity v of the arm Arm.

The back electro motive voltage $V_{bemf}$ can be given by Equation (6) as follows:

$$V_{bemf} = K_f v \quad (6)$$

In this case, a VCM circuit equation can be given by Equation (7) as follows:

$$V_{sup} = V_{drop} + I_{VCM} \cdot R_{VCM} + L_{VCM} \cdot dI_{VCM}/dt + V_{bemf} \quad (7)$$

where $V_{drop}$ represents a known voltage drop due to a circuit resistance such as an amp-on resistance.

Meanwhile, with a minor current change in the voice coil motor 4, the inductance $L_{VCM}$ can be omitted as illustrated in FIG. 2B. Saturation acceleration can be assumed in this equivalent circuit.

Without allowing for the back electro motive voltage $V_{bemf}$ and the inductance $L_{VCM}$, a maximum applicable VCM voltage $V_{VCM\_lim}$ of the voice coil motor 4 can be given by Equation (8) as follows:

$$V_{VCM\_lim} = V_{sup} - V_{drop} \quad (8)$$

As apparent from Equation (8), when the voltage drop $V_{drop}$ due to a circuit resistance has a fixed value, the maximum applicable VCM voltage $V_{VCM\_lim}$ depends only on the power supply voltage $V_{sup}$ without dependence on the magnitude of the current change in the voice coil motor 4.

Figure 3A:
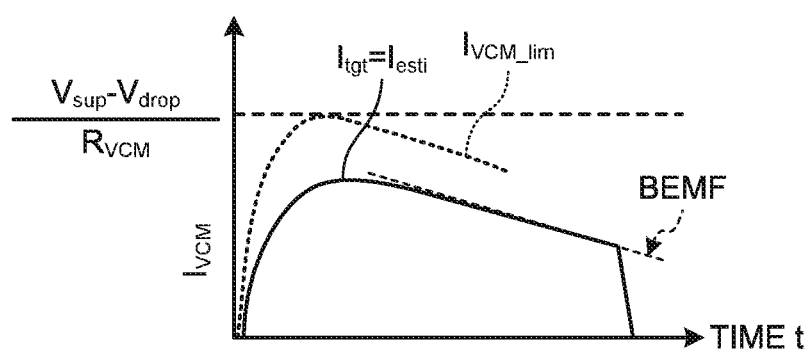
FIG. 3A is a diagram illustrating a waveform of a VCM current during an unsaturated acceleration seek.
Figure 3B:
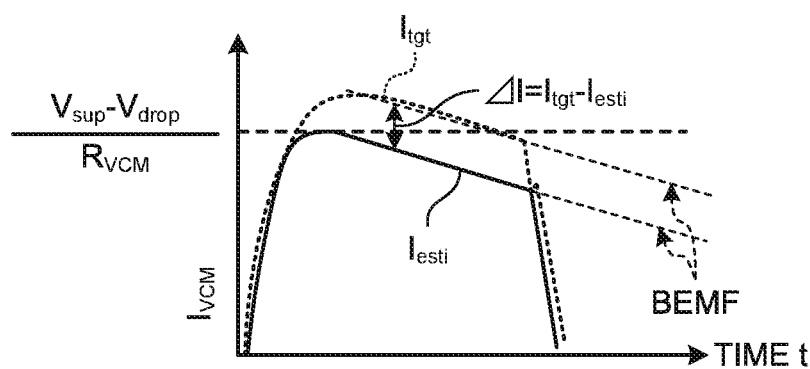
FIG. 3B is a diagram illustrating a waveform of a VCM current during a saturated acceleration seek.

FIG. 3A is a diagram illustrating a waveform of a VCM current during an unsaturated acceleration seek, and FIG. 3B is a diagram illustrating a waveform of a VCM current during a saturated acceleration seek.

Referring to FIGS. 3A and 3B, without allowing for the back electro motive voltage and the inductance $L_{VCM}$, a maximum applicable VCM current $I_{VCM\_lim}$ of the voice coil motor 4 can be given by Equation (9) with reference to Equation (8) as follows:

$$I_{VCM\_lim} = (V_{sup} - V_{drop})/R_{VCM} \quad (9)$$

Meanwhile, with allowance for the back electromotive voltage and the inductance $L_{VCM}$, the maximum applicable VCM current $I_{VCM\_lim}$ of the voice coil motor 4 at a time t can be given by Equation (10) as follows:

$$I_{VCM\_lim} = (V_{sup} - V_{drop})/L_{VCM} \cdot 1/(s_1 - s_2) \cdot (\exp(s_1 t) - \exp(s_2 t)) \quad (10)$$

Where $$S_1 = \left(-R_{VCM} + \sqrt{R_{VCM}^2 - 4L_{VCM}k_{BL}^2/m}\right) \Big/ (2L_{VCM})$$

$$S_2 = \left(-R_{VCM} - \sqrt{R_{VCM}^2 - 4L_{VCM}k_{BL}^2/m}\right) \Big/ (2L_{VCM})$$

$k_{BL}$ represents a coefficient resulting from the magnetic flux density of the coil in the voice coil motor 4 and the wire length in the magnetic field.

In an unsaturated acceleration seek, a current indication value $I_{tgt}$ sufficiently smaller than the maximum applicable VCM current $I_{VCM\_lim}$ is given as the VCM current $I_{VCM}$. In this case, the VCM current $I_{VCM}$ indicated by the current indication value $I_{tgt}$ is not limited by the maximum applicable VCM current $I_{VCM\_lim}$. Accordingly, as illustrated in FIG. 3A, the current indication value $I_{tgt}$ and an estimated VCM current $I_{esti}$ agree with each other. The estimated VCM current $I_{esti}$ is a VCM current $I_{VCM}$ calculated from an estimated velocity $v_{esti}$ of the magnetic head. The estimated velocity $v_{esti}$ of the magnetic head can be estimated by an observer in which the motion of the arm Arm relative to the current indication value $I_{tgt}$ is modeled.

When the VCM current $I_{VCM}$ flows into the voice coil motor 4, the back electromotive force BEMF actually acts on the voice coil motor 4. After the rise of the VCM current $I_{VCM}$ according to the current indication value $I_{tgt}$, the VCM current $I_{VCM}$ declines with a constant gradient.

In a saturated acceleration seek, the current indication value $I_{tgt}$ sufficiently greater than the maximum applicable VCM current $I_{VCM\_lim}$ is given as the VCM current $I_{VCM}$. In this case, the VCM current $I_{VCM}$ indicated by the current indication value $I_{tgt}$ is limited by the maximum applicable VCM current $I_{VCM\_lim}$. Accordingly, as illustrated in FIG. 3B, the VCM current $I_{VCM}$ does not flow into the voice coil motor 4 according to the current indication value $I_{tgt}$, but the VCM current $I_{VCM}$ smaller than the current indication value $I_{tgt}$ flows into the voice coil motor 4.

In this case, the VCM current $I_{VCM}$ actually flowing into the voice coil motor 4 agrees with the maximum applicable VCM current $I_{VCM\_lim}$. When the VCM current $I_{VCM}$ flows into the voice coil motor 4, the back electro motive voltage BEMF actually acts on the voice coil motor 4. After the rise of the VCM current $I_{VCM}$ up to the maximum applicable VCM current $I_{VCM\_lim}$, the VCM current $I_{VCM}$ declines with a constant gradient.

While the maximum applicable VCM current $I_{VCM\_lim}$ flows into the voice coil motor 4, the maximum applicable VCM voltage $I_{VCM\_lim}$ applies to the voice coil motor 4. In this case, the voltage between the terminals of the voice coil motor 4 becomes maximum. Accordingly, the voltage between the terminals of the voice coil motor 4 can be decided without having to actually measure the same.

In the saturated acceleration seek, a current change in the voice coil motor 4 is minor and $dI_{VCM}/dt$ in Equation (7) can be regarded as 0. In this case, the term of the inductance $L_{VCM}$ in Equation (7) can be ignored. The VCM resistance $R_{VCM}$ can be given by Equation (11) with reference to Equations (6) and (7) as follows:

$$R_{VCM} = (V_{sup} - k_{BL} \cdot v_{esti} - V_{drop})/I_{esti} \quad (11)$$

In Equation (11), the voltage drop $V_{drop}$ and the coefficient $k_{BL}$ due to the circuit resistance are already known. The estimated velocity $v_{esti}$ and the VCM estimated current $I_{esti}$ of the magnetic head can be estimated by an observer in which the motion of the arm Arm relative to the current indication value $I_{tgt}$ is modeled. Accordingly, the VCM resistance $R_{VCM}$ can be estimated by measuring the power supply voltage $V_{sup}$ without having to actually measure the voltage between the terminals of the voice coil motor 4.

Figure 4A:
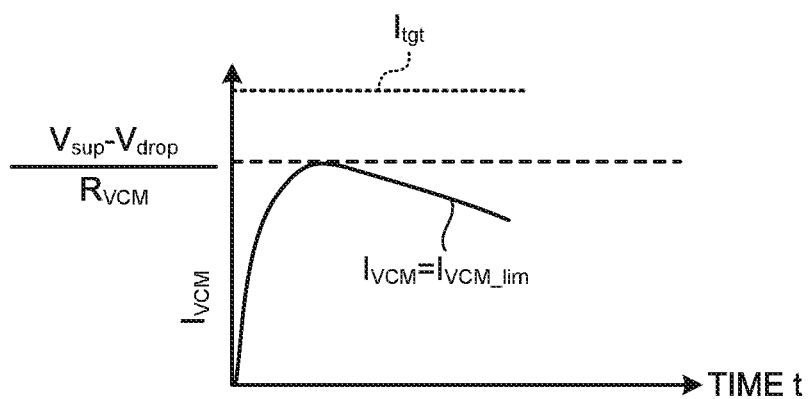
FIG. 4A is a diagram illustrating an example of a method for setting a current indication value during a saturated acceleration seek.
Figure 4B:
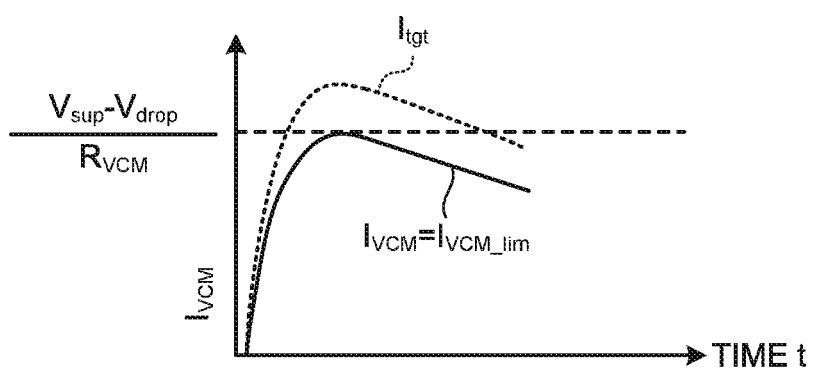
FIG. 4B is a diagram illustrating another example of a method for setting a current indication value during a saturated acceleration seek.

FIG. 4A is a diagram illustrating an example of a method for setting the current indication value during a saturated acceleration seek, and FIG. 4B is a diagram illustrating another example of a method for setting the current indication value during a saturated acceleration seek.

Referring to FIG. 4A, the current indication value $I_{tgt}$ not depending on the time t during the saturated acceleration seek can be given by Equation (12) as follows:

$$I_{tgt} = (V_{sup} - V_{drop})/R_{VCM\_set} \quad (12)$$

where $R_{VCM\_set}$ represents a VCM resistance setting value. The VCM resistance setting value $R_{VCM\_set}$ is a VCM resistance value at a low temperature within a temperature range used in the saturated acceleration seek.

In this case, the VCM current $I_{VCM}$ becomes smaller than the current indication value $I_{tgt}$, and the current indication value $I_{tgt}$ and the VCM current $I_{VCM}$ agree with each other. Setting the current indication value $I_{tgt}$ using the VCM resistance setting value $R_{VCM\_set}$ makes it possible to implement a saturated acceleration seek in a reliable manner.

Referring to FIG. 4B, the current indication value $I_{tgt}$ depending on the time t during the saturated acceleration seek can be given by Equation (13):

$$I_{tgt} = (V_{sup} - V_{drop})/L_{VCM} \cdot 1/(s_1 - s_2)$$

$$\cdot (\exp(s_1 t) - \exp(s_2 t)) \quad (13)$$

where $$S_1 = \left(-R_{VCM\_set} + \sqrt{R_{VCM\_set}^2 - 4L_{VCM}k_{BL}^2/m}\right)/(2L_{VCM})$$

$$S_2 = \left(-R_{VCM\_set} - \sqrt{R_{VCM\_set}^2 - 4L_{VCM}k_{BL}^2/m}\right)/(2L_{VCM})$$

In this case, the VCM current $I_{VCM}$ is smaller than the current indication value $I_{tgt}$, and the current indication value $I_{tgt}$ and the VCM current $I_{VCM}$ agree with each other. Setting the current indication value $I_{tgt}$ depending on the time t during the saturated acceleration seek makes it possible to improve the accuracy of estimation of the motion state of the arm Arm by the observer.

A method for calculating the VCM current $I_{VCM}$ will be described below.

Equation (14) can be obtained from the equivalent circuit illustrated in FIG. 2A as follows:

$$L_{VCM} \cdot dI_{VCM}/dt = R_{VCM} \cdot I_{VCM} + k_{BL} \cdot v = V_{VCM} \quad (14)$$

where $$v = \int_0^t a \, dt = \int_0^t \frac{k_{BL} I_{VCM}}{m} dt = \frac{k_{BL}}{m} \int_0^t dt$$

Equation (14) is subjected to Laplace transform to obtain Equation (15) where the VCM current $I_{VCM}$ after the Laplace transform is designated as $i_{VCM}$ as follows:

$$L_{VCM} \cdot i_{VCM} \cdot s = R_{VCM} \cdot i_{VCM} + k_{BL}^2/(sm) \cdot i_{VCM} = V_{VCM}/s \quad (15)$$

Equation (15) is solved for $i_{VCM}$ to obtain Equation (16) as follows:

$$i_{VCM} = V_{VCM}/L_{VCM} \cdot 1/(s^2 + R_{VCM}/L_{VCM} \cdot s + k_{BL}^2/(sm)) \quad (16)$$

$$= V_{VCM}/L_{VCM} \cdot 1/(s_1 - s_2)(1/(s - s_1) - 1/(s - s_2))$$

Equation (16) is subjected to Laplace transform to obtain Equation (17) as follows:

$$I_{VCM}$$

$$= V_{VCM}/L_{VCM} \cdot 1/(s_1 - s_2)(\exp(s_1 t) - \exp(s_2 t)) \quad (17)$$

where $$S_1 = \left(-R_{VCM} + \sqrt{R_{VCM}^2 - 4L_{VCM}k_{BL}^2/m}\right)/(2L_{VCM})$$

$$S_2 = \left(-R_{VCM} - \sqrt{R_{VCM}^2 - 4L_{VCM}k_{BL}^2/m}\right)/(2L_{VCM})$$

In the saturated acceleration seek, the VCM current $I_{VCM}$ agrees with the maximum applicable VCM current $I_{VCM\_lim}$. Accordingly, Equation (10) can be obtained from Equation (17) to determine the maximum applicable VCM current $I_{VCM\_lim}$.

The VCM resistance $R_{VCM}$ in Equation (17) is substituted for the VCM resistance setting value $R_{VCM\_set}$ to obtain Equation (13) where the current indication value $I_{tgt}$ depending on the time t during the saturated acceleration seek can be set.

Figure 5:
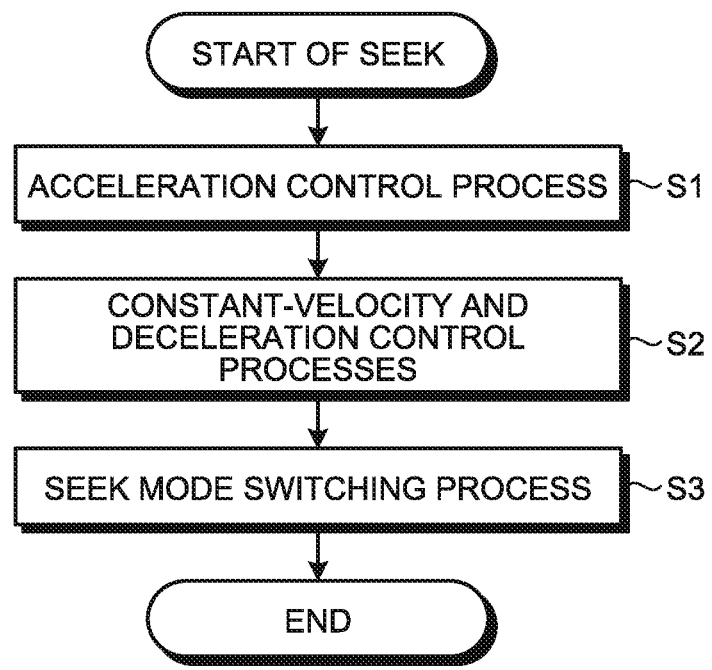
FIG. 5 is a flowchart illustrating a seek process in the magnetic disk apparatus according to the first embodiment.

FIG. 5 is a flowchart illustrating a seek process in the magnetic disk apparatus according to the first embodiment.

Referring to FIG. 5, when a seek is started, an acceleration control process is executed (S1). In the acceleration control process, the VCM current $I_{VCM}$ is flown in the positive direction to accelerate the magnetic head toward the seek destination. In the acceleration control process, there are the period of time during which the VCM current $I_{VCM}$ is saturated and the period of time during which the VCM current $I_{VCM}$ is unsaturated.

In the period of time during which the VCM current $I_{VCM}$ is saturated, the voltage between the terminals of the voice coil motor 4 becomes maximum. Accordingly, the VCM resistance $R_{VCM}$ can be estimated from Equation (11) by measuring the power supply voltage $V_{sup}$.

Next, a constant-velocity control process and a deceleration control process are executed (S2). In the deceleration control process, the VCM current $I_{VCM}$ is flown in the negative direction to decelerate the magnetic head toward the seek destination. The positive and negative directions of the VCM current $I_{VCM}$ here refer to the directions in which the VCM current $I_{VCM}$ flows in the coil of the voice coil motor 4. In the constant-velocity control process, the VCM current $I_{VCM}$ is set to 0 so that the magnetic head can be moved at a constant velocity toward the seek destination without acceleration and deceleration of the magnetic head.

The constant-velocity control process can be omitted depending on the seek distance. For example, the acceleration control process, the constant-velocity control process, and the deceleration control process can be carried out in a long seek, and the acceleration control process and the deceleration control process can be carried out in a short seek.

Next, a seek mode switching process is executed (S3). In the seek mode switching process, switching can take place between the normal seek mode and the low-heat seek mode based on the heat generated during the seek.

Figure 6:
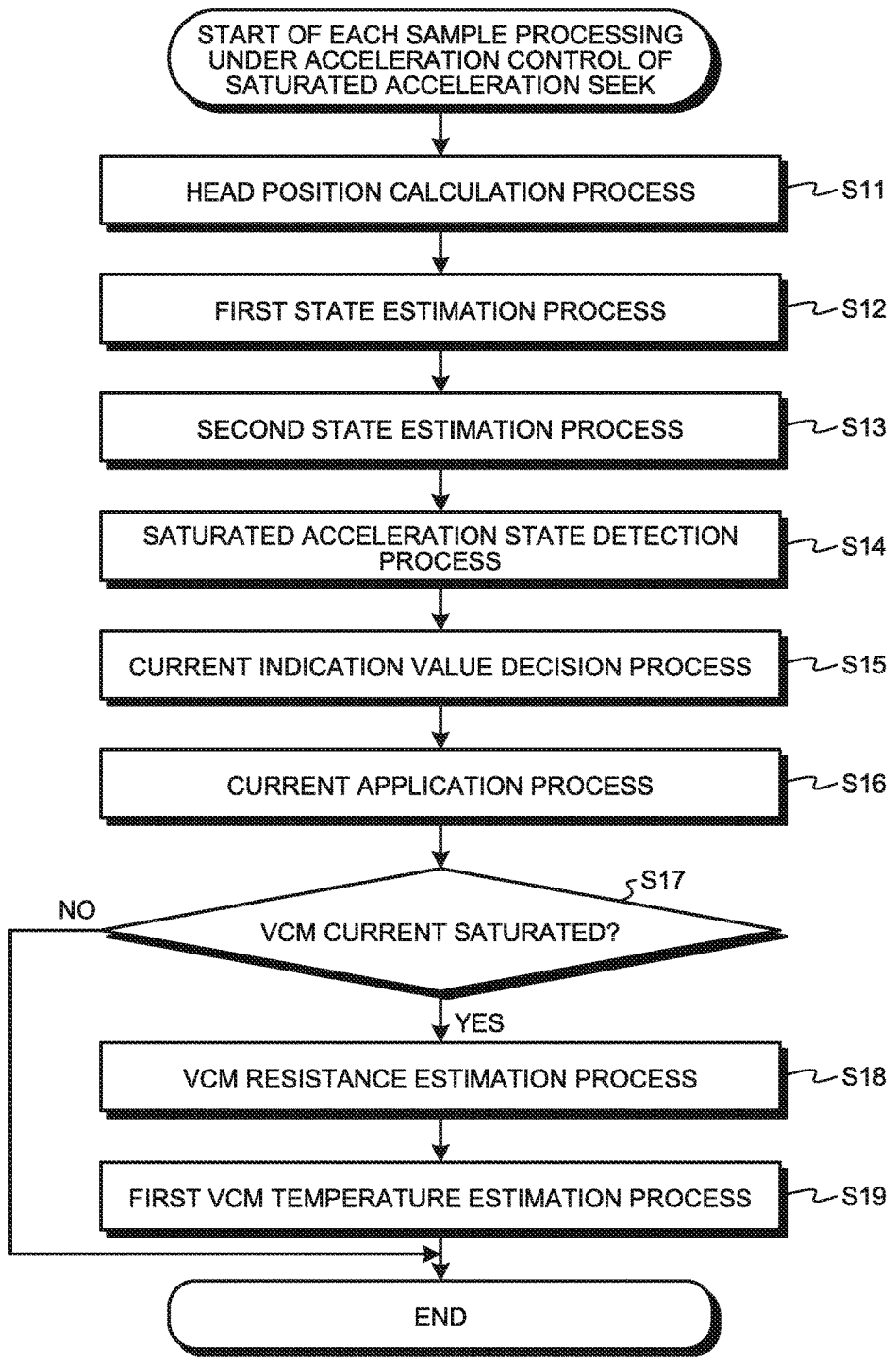
FIG. 6 is a flowchart of each sample processing during acceleration control in a saturated acceleration seek in the magnetic disk apparatus according to the first embodiment.

FIG. 6 is a flowchart of each sample processing during acceleration control on a saturated acceleration seek in the magnetic disk apparatus according to the first embodiment. The processing in FIG. 6 can be executed in the acceleration control process in FIG. 5 (S1).

Referring to FIG. 6, a head position calculation process is executed (S11). In the head position calculation process, the servo pattern recorded on the magnetic disk 2 is read by the read head HR. Then, the position of the magnetic head is demodulated from the servo pattern to determine a present position $p_{dm}$ of the magnetic head over the magnetic disk 2.

Next, a first state estimation process is executed (S12). In the first state estimation process, the observer is used to determine an estimated position $p_{esti}$ and an estimated velocity $v_{esti}$ of the magnetic head.

Next, a second state estimation process is executed (S13). In the second state estimation process, the VCM estimated current $I_{esti}$ is determined based on the estimated velocity $v_{esti}$ of the magnetic head. Specifically, an estimated acceleration $a_{esti}$ is determined from differences in the estimated velocity $v_{esti}$ between samples. Then, the estimated acceleration $a_{esti}$ is multiplied by an acceleration-current conversion factor $k_{ai}$ to determine the VCM estimated current $I_{esti}$.

Next, a saturated acceleration state detection process is executed (S14). In the saturated acceleration state detection process, the saturated state of the VCM current $I_{VCM}$ is detected. Specifically, the VCM estimated current $I_{esti}$ and the current indication value $I_{tgt}$ are compared with each other. When the current indication value $I_{tgt}$ is greater than a threshold with respect to the VCM estimated current $I_{esti}$, it can be determined that the VCM current $I_{VCM}$ is saturated. Alternatively, when a specific sample period has elapsed since the start of a seek, it may be determined that the VCM current $I_{VCM}$ is saturated.

Next, a current indication value decision process is executed (S15). In the current indication value decision process, the current indication value $I_{tgt}$ under acceleration control in a saturated acceleration seek is decided.

Next, a current application process is executed (S16). In the current application process, the current indication value $I_{tgt}$ is set to a motor driver. The motor driver applies the VCM current $I_{VCM}$ to the coil in the voice coil motor 4 based on the current indication value $I_{tgt}$.

Next, it is determined whether the VCM current $I_{VCM}$ is saturated (S17). When the VCM current $I_{VCM}$ is saturated, a VCM resistance estimation process and a first VCM temperature estimation process are carried out. Meanwhile, when the VCM current $I_{VCM}$ is not saturated, the VCM resistance estimation process and the first VCM temperature estimation process are skipped.

Next, the VCM resistance estimation process is executed (S18). In the VCM resistance estimation process, the VCM resistance $R_{VCM}$ is determined by Equation (11). In this case, the voltage drop $V_{drop}$ and the coefficient $k_{BL}$ due to the circuit resistance can have known values. The estimated velocity $v_{esti}$ can have the value determined at S12. The VCM estimated current $I_{esti}$ can have the value determined at S13. The power supply voltage $V_{sup}$ can have an actually measured value.

Next, the first VCM temperature estimation process is executed (S19). In the first VCM temperature estimation process, a VCM estimated temperature $t_{VCM1}$ is determined from the VCM resistance $R_{VCM}$. In this case, the VCM estimated temperature $t_{VCM1}$ can be given by Equation (18) as follows:

$$t_{VCM1}=1/\alpha \cdot (R_{VCM}/R_{VCM0}-1) \tag{18}$$

where $R_{VCM0}$ represents a VCM resistance at 0° C., and $\alpha$ represents a VCM resistance change rate with respect to the temperature [Ω/° C.].

Figure 7A:
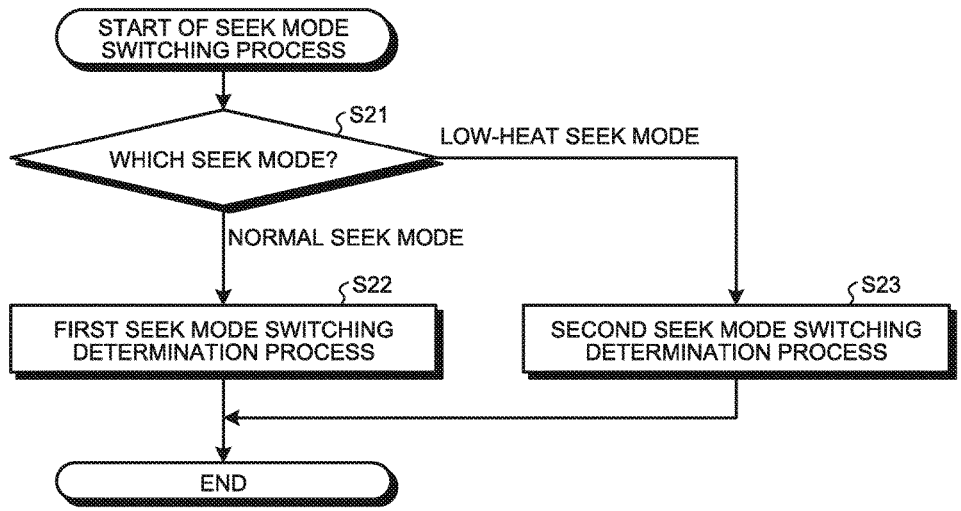
FIG. 7A is a flowchart of a seek mode switching process.
Figure 7B:
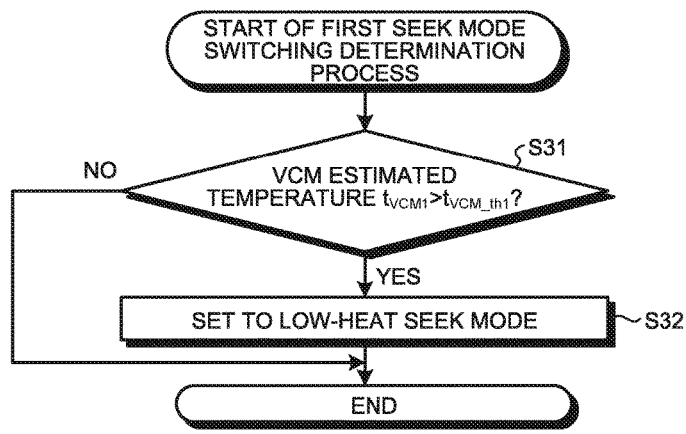
FIG. 7B is a flowchart of a first seek mode switching determination process.
Figure 7C:
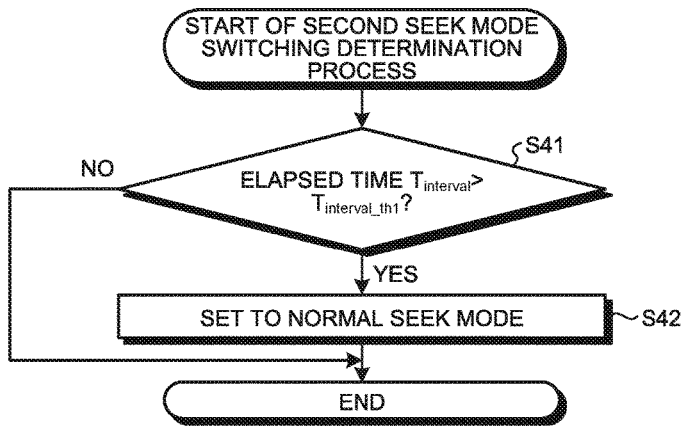
FIG. 7C is a flowchart of a second seek mode switching determination process.

FIG. 7A is a flowchart of a seek mode switching process, FIG. 7B is a flowchart of a first seek mode switching determination process, and FIG. 7C is a flowchart of a second seek mode switching determination process. The processes described in FIGS. 7A to 7C can be executed in the seek mode switching process (S3) described in FIG. 5.

Referring to FIG. 7A, the seek mode switching process can be executed at the end of a seek or during tracking. As seek modes, the normal seek mode and the low-heat seek mode are provided.

It is determined whether the present seek mode is the normal seek mode or the low-heat seek mode (S21).

In the normal seek mode, it is determined in the first seek mode switching determination process whether to switch to the other seek mode (S22). Meanwhile, in the low-heat seek mode, it is determined in the second seek mode switching determination process whether to switch to the other seek mode (S23). In the low-heat seek mode, for example, a seek control with the VCM current $I_{VCM}$ saturated is not performed but a seek control with the VCM current $I_{VCM}$ lower than that in the normal seek mode is performed.

Referring to FIG. 7B, it is determined in the first seek mode switching determination process whether to switch from the normal seek mode to the low-heat seek mode.

Specifically, it is determined whether the VCM estimated temperature $t_{VCM1}$ is higher than a threshold temperature $t_{VCM\_th1}$ (S31). The threshold temperature $t_{VCM\_th1}$ can be set based on the temperature at which the voice coil motor 4 generates dust. When the VCM estimated temperature $t_{VCM1}$ is higher than the threshold temperature $t_{VCM\_th1}$, switching takes place from the normal seek mode to the low-heat seek mode (S32).

Referring to FIG. 7C, it is determined in the second seek mode switching determination process whether to switch from the low-heat seek mode to the normal seek mode.

Specifically, an elapsed time $T_{interval}$ since the seek mode was determined as the low-heat seek mode in the previous first seek mode switching determination process is measured. Then, it is determined whether the elapsed time $T_{interval}$ has exceeded a set time $T_{interval\_th2}$ (S41).

When the elapsed time $T_{interval}$ has exceeded the set time $T_{interval\_th2}$ the low-heat seek mode, switching takes place from the low-heat seek mode to the normal seek mode (S42).

Figure 8:
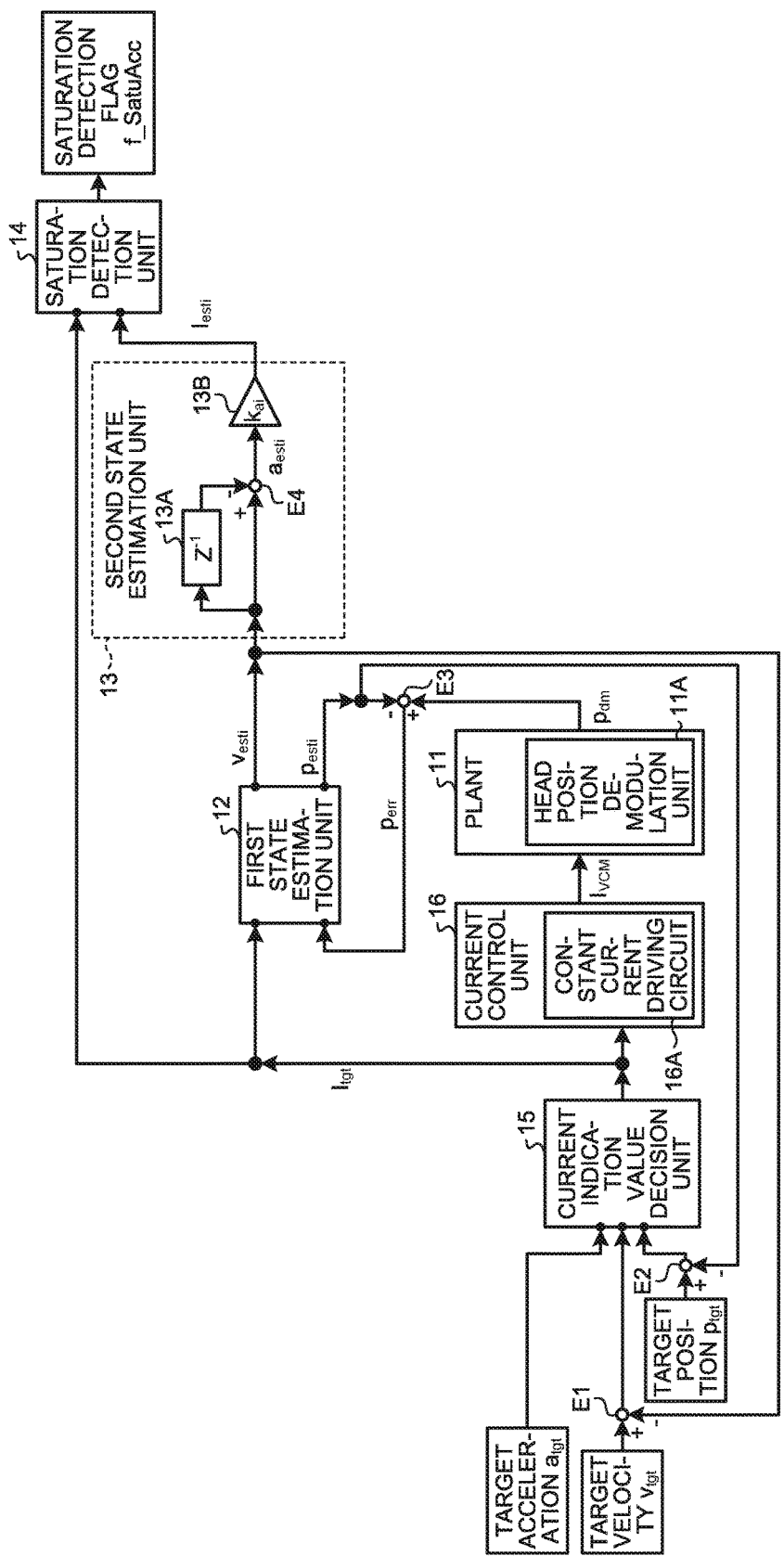
FIG. 8 is a schematic block diagram of the foreground of a seek processing system in the magnetic disk apparatus according to the first embodiment.
Figure 9A:
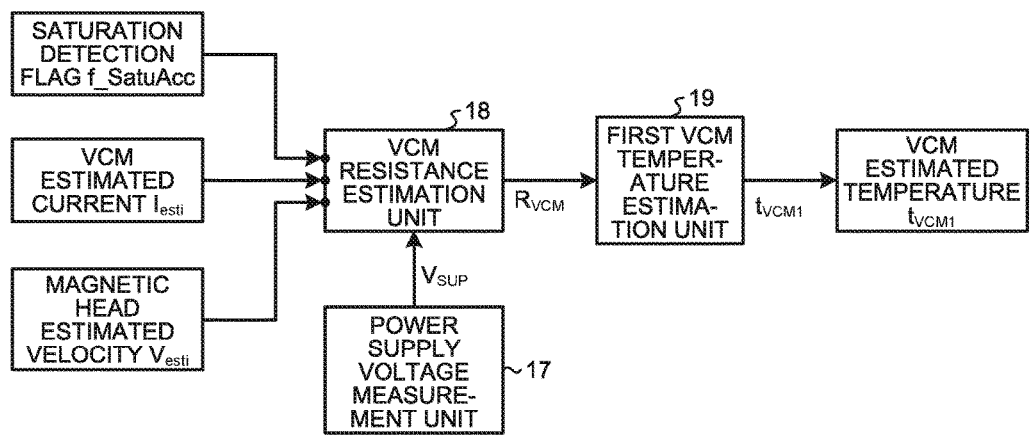
FIG. 9A is a schematic block diagram of the background of the seek processing system relating to first VCM temperature estimation in the magnetic disk apparatus according to the first embodiment.
Figure 9B:
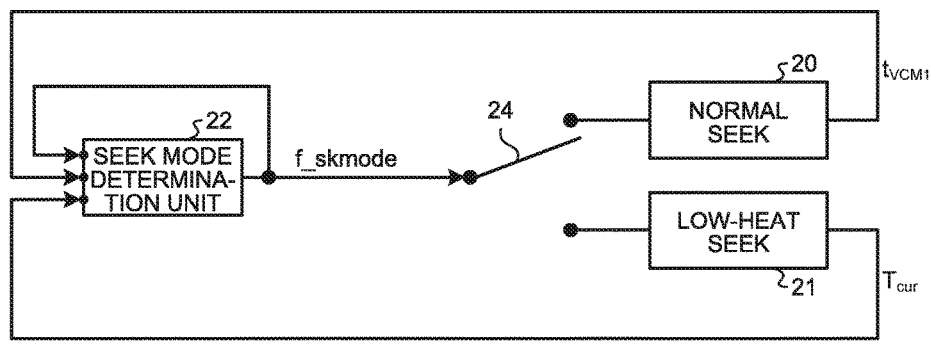
FIG. 9B is a schematic block diagram of the background of the seek processing system relating to seek mode switching in the magnetic disk apparatus according to the first embodiment.

FIG. 8 is a schematic block diagram of the foreground of a seek processing system in the magnetic disk apparatus according to the first embodiment, FIG. 9A is a schematic block diagram of the background of the seek processing system relating to first VCM temperature estimation in the magnetic disk apparatus according to the first embodiment, and FIG. 9B is a schematic block diagram of the background of the seek processing system relating to seek mode switching in the magnetic disk apparatus according to the first embodiment.

In the foreground, the process can be executed in each sample during an acceleration seek. In the background, the process can be executed in a plurality of samples during an acceleration seek.

Referring to FIG. 8, provided in. the foreground of the seek process system are a first state estimation unit 12, a second state estimation unit 13, a saturation detection unit 14, a current indication value decision unit 15, a current control unit 16, and subtractors E1 to E3.

The second state estimation unit 13 has a delay unit 13A, a conversion unit 13B, and a subtractor E4. The current control unit 16 has a constant current driving circuit 16A. The current control unit 16 can be provided in the voice coil motor control unit 7B illustrated in FIG. 1B.

Referring to FIG. 9A, provided in the background of the seek process system relating to the first VCM temperature estimation are a power supply voltage measurement unit 17, a VCM resistance estimation unit 18, and a first VCM temperature estimation unit 19.

Referring to FIG. 9B, in the background of the seek process system side relating to seek mode switching are a seek mode determination unit 22 and a seek mode switching unit 24.

The first state estimation unit 12, the second state estimation unit 13, the saturation detection unit 14, the current indication value decision unit 15, the VCM resistance estimation unit 18, the first VCM temperature estimation unit 19, the seek mode determination unit 22, the seek mode switching unit 24, and the subtractors E1 to E4 can be provided in the hard disk control unit 9 illustrated in FIG. 1B.

A plant 11 can correspond to the voice coil motor 4, the magnetic disk 2, the magnetic head, the head control unit 6, and the read/write channel 8 illustrated in FIG. 1B. The plant 11 has a head position demodulation unit 11A.

When the sector of the read destination or the write destination is specified by the host HS, the hard disk control unit 9 illustrated in FIG. 1B sets a target position $p_{tgt}$, a target velocity $v_{tgt}$ and a target acceleration $a_{tgt}$ to reach the seek destination. Referring to FIG. 8, the target acceleration $a_{tgt}$ is input into the current indication value decision unit 15. The target velocity $v_{tgt}$ is input into the subtractor E1. In addition, the estimated velocity $v_{esti}$ is input from the first state estimation unit 12 into the subtractor E1. Then, the subtractor E1 subtracts the estimated velocity $v_{esti}$ from the target velocity $v_{tgt}$, and inputs the difference between the target velocity $v_{tgt}$ and the estimated velocity $v_{esti}$ into the current indication value decision unit 15.

The target position $p_{tgt}$ is input into the subtractor E2. In addition, the estimated position $p_{esti}$ is input from the first state estimation unit 12 into the subtractor E2. Then, the subtractor E2 subtracts the estimated position $p_{esti}$ from the target position $p_{tgt}$, and inputs the difference between the target position $p_{tgt}$ and the estimated position $p_{esti}$ into the current indication value decision unit 15.

The current indication value decision unit 15 decides the current indication value $I_{tgt}$ from the target acceleration $a_{tgt}$, the difference between the target velocity $v_{tgt}$ and the estimated velocity $v_{esti}$, and the difference between the target position $p_{tgt}$ and the estimated position $p_{esti}$. The current indication value $I_{tgt}$ is input into the first state estimation unit 12, the saturation detection unit 14, and the current control unit 16.

When the current indication value $I_{tgt}$ is input into the current control unit 16, the constant current driving circuit 16A applies the VCM current $I_{VCM}$ corresponding to the current indication value $I_{tgt}$ to the coil in the voice coil motor 4. At that time, the magnetic head can seek over the magnetic disk 2 in the plant 11. Then, the servo pattern recorded on the magnetic disk 2 is read via the read head HR. The head position demodulation unit 11A demodulates the position of the magnetic head from the servo pattern to calculate the present position $p_{dm}$ of the magnetic head.

The present position $p_{dm}$ of the magnetic head is input into the subtractor E3. In addition, the estimated position $p_{esti}$ is input from the first state estimation unit 12 into the subtractor E3. Then, the subtractor E3 subtracts the estimated position $p_{esti}$ from the present position $p_{dm}$ to calculate an estimated position error $p_{err}$ and feeds the estimated position error $p_{err}$ back to the first state estimation unit 12.

The first state estimation unit 12 calculates the estimated position $p_{esti}$ and the estimated velocity $v_{esti}$ of the magnetic head based on the current indication value $I_{tgt}$ and the estimated position error $p_{err}$. At this time, the first state estimation unit 12 can provide feedback such that the estimated position error $p_{err}$ converges to 0 in a saturated acceleration seek. The estimated position $p_{esti}$ is input into the subtractor E3. The estimated velocity $v_{esti}$ is input into the subtractor E1, the second state estimation unit 13, and the VCM resistance estimation unit 18 as illustrated in FIGS. 8 and 9A.

When the estimated velocity $v_{esti}$ is input into the second state estimation unit 13, the delay unit 13A delays the estimated velocity $v_{esti}$ by one sample period and inputs the same into the subtractor E4. The subtractor E4 subtracts the estimated velocity $v_{esti}$ delayed by one sample period from the estimated velocity $v_{esti}$ input from the first. state estimation unit 12 to calculate the estimated acceleration $a_{esti}$. Then, the conversion unit 13B multiplies the estimated acceleration $a_{esti}$ by an acceleration-current conversion factor $k_{ai}$ to calculate the VCM estimated current $I_{esti}$. The VCM estimated current $I_{esti}$ is input into the saturation detection unit 14 and the VCM resistance estimation unit 18 as illustrated in FIGS. 8 and 9A.

The saturation detection unit 14 compares the VCM estimated current $I_{esti}$ with the current indication value $I_{tgt}$. When the current indication value $I_{tgt}$ is greater than the threshold with respect to the VCM estimated current $I_{esti}$, the saturation detection unit 14 determines that the VCM current $I_{VCM}$ is saturated. Then, the saturation detection unit 14 sends a flag f_SatuAcc notifying the saturated state of the VCM current $I_{VCM}$ to the VCM resistance estimation unit 18 as illustrated in FIG. 9A.

For example, the flag f_SatuAcc can be set to low level at start of a seek. When it is determined that the VCM current $I_{VCM}$ is saturated during the seek, the flag f_SatuAcc can be shifted to high level and. kept in. that state during the seek.

Referring to FIG. 9A, the power supply voltage measurement unit 17 measures the power supply voltage $V_{sup}$ and inputs the same to the VCM resistance estimation. unit 18. Upon receipt of the flag f_SatuAcc from the saturation detection unit 14, the VCM resistance estimation unit 18 calculates the VCM resistance $R_{VCM}$. The VCM resistance $R_{VCM}$ can be calculated by Equation (11). The VCM resistance $R_{VCM}$ is input into the first VCM temperature estimation unit 19.

With input of the VCM resistance $R_{VCM}$ from the first VCM temperature estimation unit 19, the first VCM temperature estimation unit 19 calculates the VCM estimated temperature $t_{VCM1}$. The VCM estimated temperature $t_{VCM1}$ can be calculated by Equation (18). The VCM estimated temperature $t_{VCM1}$ is input into the seek mode determination unit 22 as illustrated in FIG. 9B.

Referring to FIG. 9B, the seek mode determination unit 22 generates a flag f_skmode to instruct for switching between a normal seek 20 and a low-heat seek 21. The seek mode determination unit 22 can refer to the flag f_skmode to determine whether the present seek mode is the normal seek mode or the low-heat seek mode.

When the present seek mode is the normal seek mode, the seek mode determination unit 22 determines whether to switch from the normal seek mode to the low-heat seek mode based on the VCM estimated temperature $t_{VCM1}$ output by the seek action in the normal seek mode.

When the present seek mode is the low-heat seek mode, the seek mode determination unit 22 determines whether to switch from the low-heat seek mode to the normal seek mode based on the elapsed time $T_{interval}$ since the transition to the low-heat seek mode.

The elapsed time $T_{interval}$ can be calculated using a current time $T_{cur}$ output by the seek action in the low-heat seek mode. The current time $T_{cur}$ may be a time stamp incremented in a servo sector or a system on chip (SoC) time stamp.

In this case, the elapsed time $T_{interval}$ can be given by Equation (19) as follows:

$$T_{interval} = T_{cur} - T_{in} \quad (19)$$

where $T_{in}$ represents the time at which a transition to the low-heat seek mode occurred.

The seek mode switching unit 24 executes switching between the normal seek 20 and the low-heat seek 21 based on the flag f_skmode sent from the seek mode determination unit 22.

(Second Embodiment)

According to the method described in FIG. 7C, the elapsed time $T_{interval}$ since the transition to the low-heat seek mode is used to determine whether to switch from the low-heat seek mode to the normal seek mode.

In a second embodiment, a VCM estimated temperature $t_{VCM2}$ output by the seek action in the low-heat seek mode is used to determine whether to switch from the low-heat seek mode to the normal seek mode. The VCM estimated temperature $t_{VCM2}$ can be calculated based on the properties of heat generation and heat release resulting from application of the VCM current to the voice coil motor 4. When the VCM estimated temperature $t_{VCM2}$ is lower than a predetermined temperature, switching can take place from the low-heat seek mode to the normal seek mode.

Figure 10:
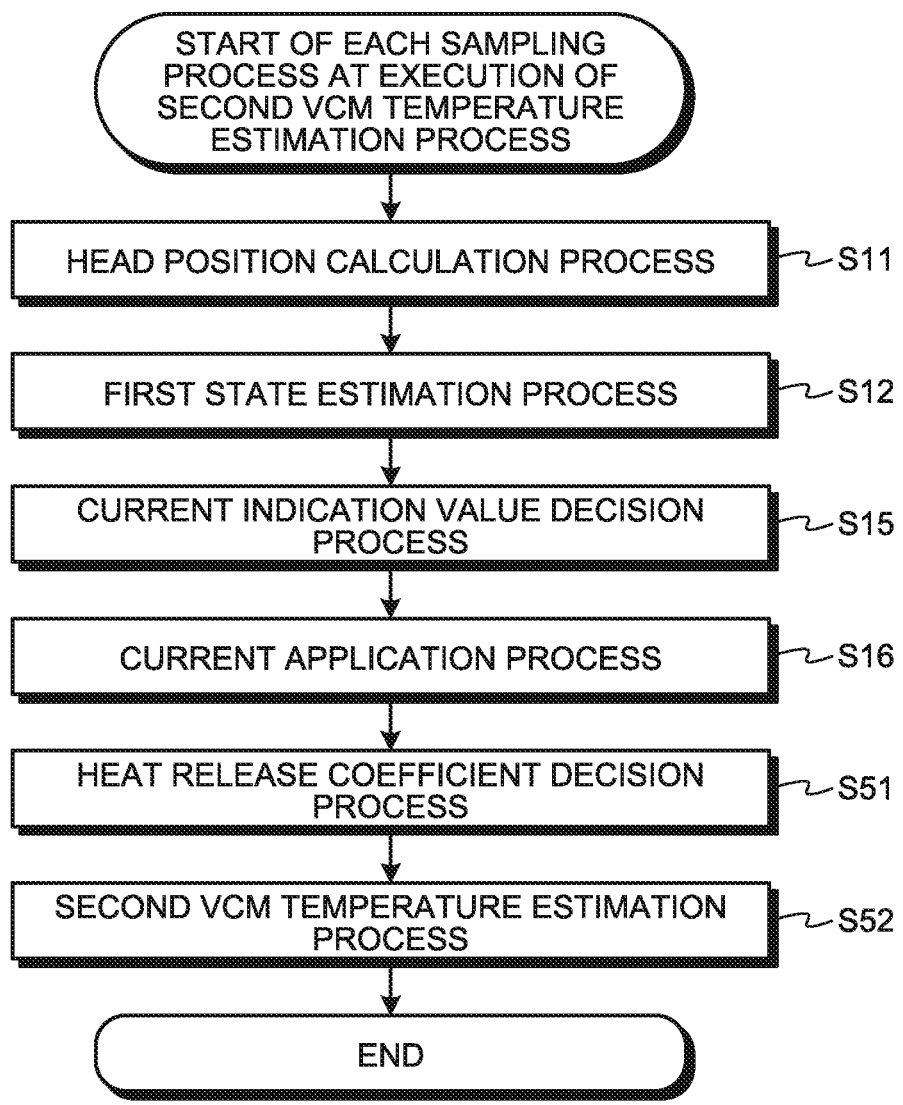
FIG. 10 is a flowchart of each sample processing during execution of a second VCM temperature estimation process in a magnetic disk apparatus according to a second embodiment.

FIG. 10 is a flowchart of each sample processing during execution of a second VCM temperature estimation process in a magnetic disk apparatus according to the second embodiment.

Referring to FIG. 10, the execution of the second VCM temperature estimation process at S52 requires the current indication value $I_{tgt}$ and a heat release coefficient $\gamma$ (deg/sec). In order to determine the current indication value $I_{tgt}$, steps S11, S12, S15, and S16 described in FIG. 6 are carried out prior to the second VCM temperature estimation process at S52. In order to determine the heat release coefficient $\gamma$, a heat release decision process is carried out prior to the second VCM temperature estimation process at S52 (S51).

In the heat release coefficient decision process, the heat release coefficient $\gamma$ of the voice coil motor 4 is calculated. The heat release coefficient $\gamma$ depends on the VCM temperature $t_{VCM}$ and a housing temperature $t_{body}$. Accordingly, heat release coefficient matrix data $\gamma_{ij}$ including indexes (i, j) of the VCM temperature $t_{VCM}$ and the housing temperature $t_{body}$ may be preset or may be calculated by an equation. The heat release coefficient matrix data $\gamma_{ij}$ may be determined by calibration or may be updated by learning. The heat release coefficient matrix data $\gamma_{ij}$ may be set as values of a model that is attenuated exponentially between the VCM temperature $t_{VCM}$ and the housing temperature $t_{body}$. The VCM temperature $t_{VCM}$ for use in calculation of the heat release coefficient $\gamma$, can be the VCM estimated temperature $t_{VCM2}$.

Next, the second VCM temperature estimation process is executed (S52). In the second VCM temperature estimation process, at switching to the low-heat seek mode in the first seek mode switching determination process (S32), the VCM estimated temperature $t_{VCM1}$ output by the seek action in the low-heat seek mode is set as a VCM reference temperature $t_{VCM\_base}$.

With respect to the VCM reference temperature $t_{VCM\_base}$, the VCM estimated temperature $t_{VCM2}$ is sequentially determined with allowance made for the amount of change in heat generation temperature obtained by multiplying a Joule loss due to application of the VCM current by a heat resistance coefficient $\beta$ (deg/(W·sec)) and the amount of change in heat release temperature obtained by multiplying the heat release coefficient $\gamma$ by the elapsed time. In this case, the VCM estimated temperature $t_{VCM2}$ can be given by Equation (20) as follows:

$$t_{VCM2}[1] = t_{VCM\_base}$$

$$t_{VCM2}[n]$$

$$= t_{VCM2}[n-1]$$

$$+ (\beta \cdot R_{VCM0}(1 + \alpha \cdot t_{VCM2}[n-1])I_{tgt}[n]^2 - \gamma_{ij})T_s \quad (20)$$

where n represents the number of samples after switching to the low-heat seek mode, and $T_s$ (sec) represents the servo sector interval time. In Equation (20), the temperature change with the VCM resistance $R_{VCM}$ is allowed for.

In Equation (20), the VCM estimated temperature $t_{VCM2}$ is determined in each servo sector after transition to the low-heat seek mode. Alternatively, the VCM estimated temperature $t_{VCM2}$ may be updated seek by seek.

Figure 11:
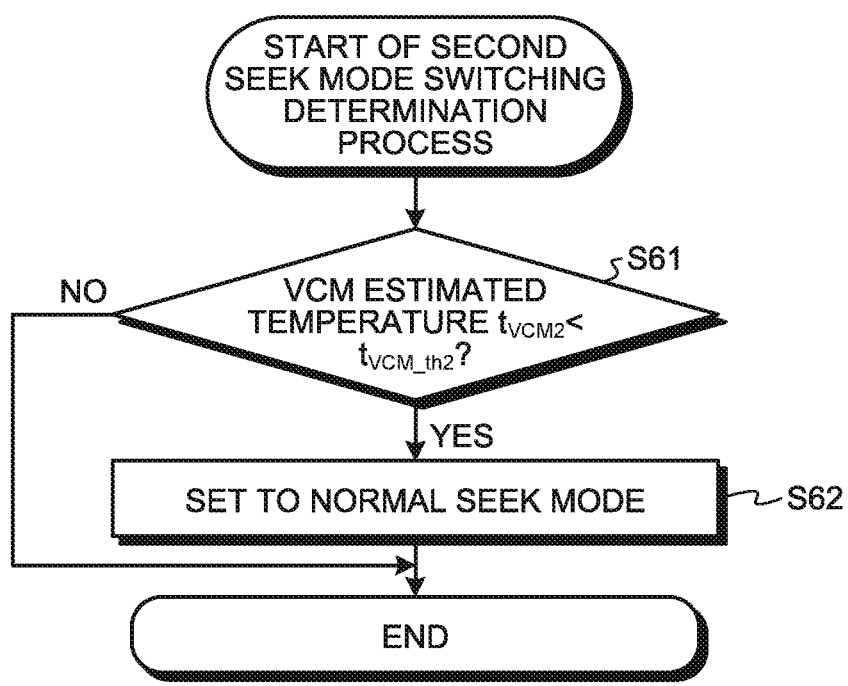
FIG. 11 is a flowchart of a second seek mode switching determination process in the magnetic disk apparatus according to the second embodiment.

FIG. 11 is a flowchart of a second seek mode switching determination process in the magnetic disk apparatus according to the second embodiment.

Referring to FIG. 11, the second seek mode switching determination process is executed in the low-heat seek mode. In the second seek mode switching determination process, it is determined whether to switch from the low-heat seek mode to the normal seek mode.

Specifically, it is determined whether the VCM estimated temperature $t_{VCM2}$ is lower than a threshold temperature $t_{VCM\_th2}$ (S61). When the VCM estimated temperature $t_{VCM2}$ is lower than the threshold temperature $t_{VCM\_th2}$, switching takes place from the low-heat seek mode to the normal seek mode (S62).

Figure 12A:
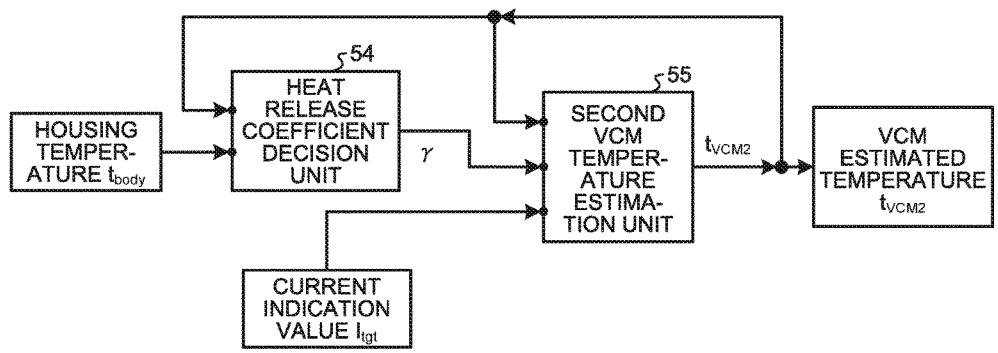
FIG. 12A is a schematic block diagram of the background of a seek processing system relating to second VCM temperature estimation in the magnetic disk apparatus according to the second embodiment.
Figure 12B:
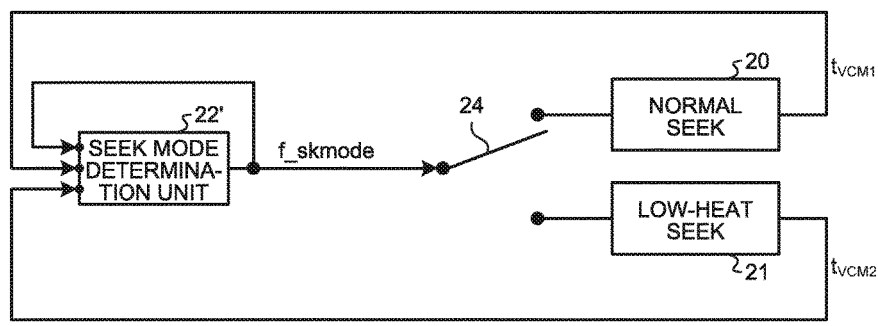
FIG. 12B is a schematic block diagram of the background of the seek processing system relating to seek mode switching in the magnetic disk apparatus according to the second embodiment.

FIG. 12A is a schematic block diagram of the background of a seek processing system relating to second VCM temperature estimation in the magnetic disk apparatus according to the second embodiment, and FIG. 12B is a schematic block diagram of the background of the seek processing system relating to seek mode switching in the magnetic disk apparatus according to the second embodiment.

The foreground of the seek processing system can be configured in the same manner as that illustrated in FIG. 8.

The background relating to first VCM temperature estimation in the seek processing system can be configured in the same manner as that illustrated in FIG. 9A.

Referring to FIG. 12A, the background of the seek processing system relating to the second VCM temperature estimation has a heat release coefficient decision unit 54 and a second VCM temperature estimation unit 55.

Referring to FIG. 12B, the background of the seek processing system side relating to the seek mode switching has a seek mode determination unit 22' instead of the seek mode determination unit 22.

As illustrated in FIG. 12A, the housing temperature $t_{body}$ is input into the heat release coefficient decision unit 54. The housing temperature $t_{body}$ can be measured by the temperature sensor TN illustrated in FIG. 1B. In addition, the VCM estimated temperature $t_{VCM2}$ is input from the second VCM temperature estimation unit 55 into the heat release coefficient decision unit 54. The heat release coefficient decision unit 54 calculates the heat release coefficient γ based on the housing temperature $t_{body}$ and the VCM estimated temperature $t_{VCM2}$.

The heat release coefficient γ is input into the second VCM temperature estimation unit 55. In addition, the current indication value $I_{tgt}$ is input from the current indication value decision unit 15 into the second VCM temperature estimation unit 55. At an unsaturated acceleration seek, the current indication value $I_{tgt}$ and the VCM estimated current $I_{esti}$ are almost equal, and the VCM estimated current $I_{esti}$ may be used instead of the current indication value $I_{tgt}$. The VCM estimated temperature $t_{VCM2}$ is fed back to the second VCM temperature estimation unit 55. Then, the second VCM temperature estimation unit 55 uses Equation (20) to calculate the VCM estimated temperature $t_{VCM2}$.

Referring to FIG. 9B, the seek mode determination unit 22' generates a flag f_skmode to instruct for switching between the normal seek 20 and the low-heat seek 21. The seek mode determination unit 22' refers to the flag f_skmode to determine whether the present seek mode is the normal seek mode or the low-heat seek mode.

When the present seek mode is the normal seek mode, the seek mode determination unit 22' determines whether to switch from the normal seek mode to the low-heat seek mode based on the VCM estimated temperature $t_{VCM1}$ output by the seek action in the normal seek mode.

When the present seek mode is the low-heat seek mode, the seek mode determination unit 22' determines whether to switch from the low-heat seek mode to the normal seek mode based on the VCM estimated temperature $t_{VCM2}$ output by the seek action in the low-heat seek mode.

At that time, the VCM estimated temperature $t_{VCM2}$ output by the seek action in. the low-heat seek mode can be updated in each sample period. Accordingly, once the VCM temperature $t_{VCM}$ becomes lower than the threshold temperature on the assumption about dust generation by the voice coil motor 4, switching to the normal seek mode can take place. This improves access performance as compared to the method using the elapsed time $T_{interval}$ since the transition to the low-heat seek mode to determine whether to switch from the low-heat seek mode to the normal seek mode.

(Third Embodiment)

In the embodiment described in FIG. 7B, when the VCM estimated temperature $t_{VCM1}$ is higher than the threshold temperature $t_{VCM\_th1}$ calculated in the first VCM temperature estimation process described in FIG. 6, switching takes place from the normal seek mode to the low-heat seek mode.

The VCM estimated temperature $t_{VCM1}$ is calculated based on the VCM current $I_{VCM}$ saturated in the normal seek mode. Accordingly, when the unsaturated acceleration seek is continuously performed in the normal seek mode, the VCM estimated temperature $t_{VCM1}$ cannot be updated.

Accordingly, in a third embodiment, when the VCM estimated temperature $t_{VCM2}$ calculated in the second VCM temperature estimation process described in FIG. 10 is higher than a threshold temperature $t_{VCM\_th3}$, switching takes place from the normal seek mode to the low-heat seek mode. In this case, the second VCM temperature estimation process can be executed regardless of whether the normal seek mode or the low-heat seek mode. In the second VCM temperature estimation process, the VCM estimated temperature $t_{VCM2}$ can be updated in each sample period.

At the start of the magnetic disk apparatus or the end of a seek, the VCM resistance estimation process and the first VCM temperature estimation process described in FIG. 6 can be executed at a seek saturated acceleration section in a saturated acceleration seek. Then, the VCM estimated temperature $t_{VCM1}$ determined in the first VCM temperature estimation process can be set as the VCM reference temperature $t_{VCM\_base}$, in Equation (20).

Accordingly, even when the VCM estimated temperature $t_{VCM1}$ cannot be updated because an unsaturated acceleration seek is continuously performed in the normal seek mode, the VCM estimated temperature $t_{VCM2}$ can be updated. Therefore, even when the VCM temperature $t_{VCM}$ is higher than the threshold temperature on the assumption about the dust generation by the voice coil motor 4, it is possible to prevent continuance of the normal seek mode and dust generation by the voice coil motor 4.

(Fourth Embodiment)

In a fourth embodiment, at the start of the magnetic disk apparatus, the housing temperature $t_{body}$ is set as the VCM reference temperature $t_{VCM\_base}$ for use in the second VCM temperature estimation process described in FIG. 10. The second VCM temperature estimation process is executed in each sample.

Accordingly, the VCM estimated temperature $t_{VCM2}$ can be calculated from the start of the magnetic disk apparatus in each sample. Therefore, switching can take place between the normal seek mode and the low-heat seek mode based on the VCM estimated temperature $t_{VCM2}$ immediately after the start of the magnetic disk apparatus.

In the foregoing embodiments, the seek mode is switched between two modes, the normal seek mode and the low-heat seek mode, based on heat generation at a seek time. Alternatively, the seek mode may be switched between three modes or more. For example, as additional seek modes, mid-heat seek mode in which heat is less generated than in the normal seek mode and a low-heat seek mode in which heat is less generated than in the mid-heat seek mode may be provided.

This makes it possible to perform a finer seek control based on heat generation at a seek time and suppress performance degradation at a seek time while reducing heat generation during the seek.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk apparatus comprising:
a magnetic disk;
a magnetic head that accesses the magnetic disk;
a voice coil motor that drives the magnetic head over the magnetic disk;
a driving circuit that applies a VCM current to the voice coil motor; and
a VCM resistance estimation unit that estimates a VCM resistance in the voice coil motor based on the saturated VCM current and a velocity of the magnetic head, wherein
when the VCM current is saturated, the voltage between terminals of the voice coil motor becomes maximum.

2. A magnetic disk apparatus comprising:
a magnetic disk;
a magnetic head that accesses the magnetic disk;
a voice coil motor that drives the magnetic head over the magnetic disk;
a driving circuit that applies a VCM current to the voice coil motor;
a VCM resistance estimation unit that estimates a VCM resistance in the voice coil motor based on the saturated VCM current and a velocity of the magnetic head; and
a first VCM temperature estimation unit that estimates a VCM temperature based on the VCM resistance in the voice coil motor.

3. The magnetic disk apparatus of claim 2, further comprising a seek mode determination unit that instructs for switching between a normal seek mode and a low-heat seek mode in which heat is less generated than in the normal seek mode, based on the VCM temperature estimated by the first VCM temperature estimation unit.

4. The magnetic disk apparatus of claim 3, wherein
when the present seek mode is the normal seek mode, the seek mode determination unit determines whether to switch from the normal seek mode to the low-heat seek mode based on the VCM temperature estimated by the first VCM temperature estimation unit, and
when the present seek mode is the low-heat seek mode, the seek mode determination unit determines whether to switch from the low-heat seek mode to the normal seek mode based on an elapsed time since the transition to the low-heat seek mode.

5. The magnetic disk apparatus of claim 3, further comprising:
a heat release coefficient decision unit that decides a heat release coefficient of the voice coil motor based on the VCM temperature of the voice coil motor and the temperature of a housing in which the voice coil motor is installed; and
a second VCM temperature estimation unit that estimates the VCM temperature based on the value of a current applied to the voice coil motor and the heat release coefficient.

6. The magnetic disk apparatus of claim 5, wherein
when the present seek mode is the normal seek mode, the seek mode determination unit determines whether to switch from the normal seek mode to the low-heat seek mode based on the VCM temperature estimated by the first VCM temperature estimation unit, and
when the present seek mode is the low-heat seek mode, the seek mode determination unit determines whether to switch from the low-heat seek mode to the normal seek mode based on the VCM temperature estimated by the second VCM temperature estimation unit.

7. The magnetic disk apparatus of claim 5, wherein
when the present seek mode is the normal seek mode and the VCM temperature estimated by the second VCM temperature estimation unit is higher than a first threshold temperature, the seek mode determination unit switches from the normal seek mode to the low-heat seek mode, and
when the present seek mode is the low-heat seek mode and the VCM temperature estimated by the second VCM temperature estimation unit is lower than a second threshold temperature, the seek mode determination unit switches from the low-heat seek mode to the normal seek mode.

8. The magnetic disk apparatus of claim 5, comprising:
a housing to which the voice coil motor is fixed; and
a temperature sensor that measures the temperature of the housing, wherein
the second VCM temperature estimation unit estimates the VCM temperature with reference to the temperature measured by the temperature sensor.

9. The magnetic disk apparatus of claim 3, wherein
the normal seek mode includes at least a period of time during which the VCM current is saturated, and
the low-heat seek mode includes a period of time during which the VCM current is unsaturated but does not include a period of time during which the VCM current is saturated.

10. The magnetic disk apparatus of claim 1, comprising:
a first state estimation unit that estimates the velocity of the magnetic head based on a current indication value of the voice coil motor; and
a second state estimation unit that estimates the VCM current in the voice coil motor based on the velocity of the magnetic head estimated by the first state estimation unit, wherein
when the velocity of the magnetic head estimated by the first state estimation unit is designated as $v_{esti}$, the VCM current in the voice coil motor estimated by the second state estimation unit is designated as $I_{esti}$, a voltage drop due to a circuit resistance is designated as $V_{drop}$, a power supply voltage is designated as $V_{sup}$, and a coefficient is designated as $k_{BL}$, a VCM resistance $R_{VCM}$ in the voice coil motor is given by the equation $R_{VCM} = (V_{sup} - k_{BL} v_{esti} - V_{drop})/I_{esti}$.

11. The magnetic disk apparatus of claim 10, wherein the saturated VCM current in the voice coil motor is smaller than the current indication value.

12. The magnetic disk apparatus of claim 11, wherein the current indication value is greater than a maximum applicable VCM current in the voice coil motor.

13. The magnetic disk apparatus of claim 12, wherein, when the inductance of the voice coil motor is designated as $L_{VCM}$ and the mass of an arm on which the magnetic head is mounted is designated as m, a maximum applicable VCM current $I_{VCM\_lim}$ in the voice coil motor at a time t is given by the equation:

$$I_{VCM\_lim} = (V_{sup} - V_{drop})/L_{VCM} \cdot 1/(s_1 - s_2) \cdot (\exp(s_1 t) - \exp(s_2 t))$$

-continued $$S_1 = \left(-R_{VCM} + \sqrt{R_{VCM}^2 - 4L_{VCM}k_{BL}^2/m}\right)/(2L_{VCM})$$

$$S_2 = \left(-R_{VCM} - \sqrt{R_{VCM}^2 - 4L_{VCM}k_{BL}^2/m}\right)/(2L_{VCM}).$$

14. The magnetic disk apparatus of claim 12, wherein, when the VCM resistance setting value is designated as $R_{VCM\_set}$, the current indication value $I_{tgt}$ is given by the equation $I_{tgt}=(V_{sup}-V_{drop})/R_{VCM\_set}$.

15. The magnetic disk apparatus of claim 12, wherein, when the inductance of the voice coil motor is designated as $L_{VCM}$, the mass of an arm on which the magnetic head is mounted is designated as m, and the VCM resistance setting value is designated as $R_{VCM\_set}$, the current indication value $I_{tgt}$ at a time t is given by the equation:

$$I_{tgt} = (V_{sup} - V_{drop})/L_{VCM} \cdot 1/(s_1 - s_2) \cdot (\exp(s_1 t) - \exp(s_2 t))$$

$$S_1 = \left(-R_{VCM\_set} + \sqrt{R_{VCM\_set}^2 - 4L_{VCM}k_{BL}^2/m}\right)/(2L_{VCM})$$

$$S_2 = \left(-R_{VCM\_set} - \sqrt{R_{VCM\_set}^2 - 4L_{VCM}k_{BL}^2/m}\right)/(2L_{VCM}).$$

16. The magnetic disk apparatus of claim 1, comprising:
a first state estimation unit that estimates the velocity and position of the magnetic head based on a current indication value of the voice coil motor;
a second state estimation unit that estimates the VCM current in the voice coil motor based on the velocity of the magnetic head estimated by the first state estimation unit;
a saturation detection unit that detects the saturated state of the VCM current based on results of comparison between the VCM current in the voice coil motor estimated by the second state estimation unit and the current indication value;
a current indication value decision unit that decides the current indication value from a target acceleration, the difference between a target velocity and the velocity estimated by the first state estimation unit, and the difference between a target position and the position estimated by the first state estimation unit;
a current control unit that applies the VCM current to the voice coil motor based on the current indication value; and
a head position demodulation unit that demodulates the position of the magnetic head based on a servo pattern read by the magnetic head from the magnetic disk, wherein
the difference between the position of the magnetic head demodulated by the head position demodulation unit and the position estimated by the first state estimation unit is input into the first state estimation unit.

17. The magnetic disk apparatus of claim 1, comprising a seek control unit that performs a seek control of the magnetic head, wherein
the seek control unit sets a profile of the VCM current to allow the magnetic head to reach the seek destination from the present position, and
the seek control unit sets the profile of the VCM current based on the VCM resistance estimated by the VCM resistance estimation unit.

18. The magnetic disk apparatus of claim 17, wherein the seek control unit executes:
an acceleration control process to accelerate the magnetic head toward the seek destination;
a constant-velocity control process to move the magnetic head toward the seek destination at a constant velocity; and
a deceleration control process to decelerate the magnetic head toward the seek destination, and
the acceleration control process includes a period of time during which the VCM current is saturated and a period of time during which the VCM current is unsaturated.

19. The magnetic disk apparatus of claim 18, executing in the acceleration control process:
a head position calculation process to demodulate the position of the magnetic head based on a servo pattern read by the magnetic head from the magnetic disk;
a first state estimation process to estimate the velocity and position of the magnetic head based on an current indication value in the voice coil motor;
a second state estimation process to estimate the VCM current in the voice coil motor based on the velocity of the magnetic head estimated by the first state estimation process;
a saturated acceleration state detection process to detect the saturated state of the VCM current based on results of comparison between the VCM current in the voice coil motor estimated in the second state estimation process and the current indication value;
a current indication value decision process to decide the current indication value from a target acceleration, the difference between a target velocity and the velocity estimated in the first state estimation process, and the difference between a target position and the position estimated in the first state estimation process;
a current application process to apply the VCM current to the voice coil motor based on the current indication value;
a VCM resistance estimation process to estimate a VCM resistance in the voice coil motor based on the saturated VCM current and the velocity of the magnetic head; and
a VCM temperature estimation process to estimate a VCM temperature based on the VCM resistance in the voice coil motor.

* * * * *